(12) United States Patent
Carlton (10) Patent No.: US 6,378,282 B1
(45) Date of Patent: Apr. 30, 2002

(54) FRUIT HARVESTING APPARATUS

(76) Inventor: James P. Carlton, 1035 N. Florida Ave., Wauchula, FL (US) 33873

( * ) Notice: Subject to any disclaimer, the term of this patent is extended or adjusted under 35 U.S.C. 154(b) by 0 days.

(21) Appl. No.: 09/541,548

(22) Filed: Apr. 3, 2000

(51) Int. Cl.[7] ............................................. A01D 46/24
(52) U.S. Cl. ........................................ 56/330; 56/328.1
(58) Field of Search ................................ 56/328.1, 329, 56/330, 331, 340.1, 15.1, 15.2, 15.7, 15.8, DIG. 19

(56) References Cited

U.S. PATENT DOCUMENTS

| 3,522,696 A | 8/1970 | Millier et al. |
|---|---|---|
| 3,948,027 A | 4/1976 | Edwards |
| 4,508,062 A | 4/1985 | Berry et al. |
| 4,860,529 A | 8/1989 | Peterson et al. |
| 5,027,593 A | 7/1991 | Korthuis et al. |
| 5,661,963 A | 9/1997 | Scott |
| 5,765,350 A | 6/1998 | Ochse |
| 5,946,896 A | 9/1999 | Daniels |

*Primary Examiner*—Robert E. Pezzuto
(74) *Attorney, Agent, or Firm*—Terry M. Sanks, Esq.; Beusse Brownlee Bowdoin & Wolter, P.A.

(57) ABSTRACT

A harvesting apparatus for dislodging produce from trees comprising a support structure, a boom vertically placed where a first end is connected to the support structure, a positioning apparatus to position a second end of the boom radially from the first end, horizontal posts connected to the boom wherein a first post is positioned above a second post, crank arm rotatably connected between the horizontal posts along an axis where the crank arm has a plurality of elbows, one of a plurality of spools rotatably attached to the crank arm at each respective elbow whereby each spool is free to rotate axially, a plurality of wands axialy attached to each spool and spaced around each spool, and a rotating apparatus for rotating the crank arm about its axis.

24 Claims, 6 Drawing Sheets

FRUIT HARVESTING APPARATUS

BACKGROUND OF THE INVENTION

The present invention relates to a produce harvesting apparatus and method, and more specifically to an apparatus for removing fruit from a canopy of a tree where wands inserted into the canopy are not physically held in place but which freely move in the canopy as a result of resistance encountered by the foliage of the canopy while the wands are actuated vertically and horizontally.

Various approaches have been developed to harvest produce from trees, such as citrus and other fruit, with the intention of efficiently removing the fruit while not damaging the trees. While it is believed that some methods have included shaking the trunks of the trees, others involve inserting stationary rods into a tree's canopy and vibrating or rotating them in some fashion. It is further believed that none of these devices have been fully successful in picking enough fruit so that the excess fruit left must be picked by hand, while at the same time minimizing damage done to the trees. In several cases, wands, which are inserted into the canopy, are connected to devices that rotate the wands through the canopy. The wands are fixed so that they are not free to move in the canopy as a result of resistance encountered by the foliage. It is also believed that damage to the trees occurs because of the fixed positioning of the wands. For example, it is believed that U.S. Pat. Nos. 3,522,696, and 4,860,529 disclose wands that are fixed to a component which rotates the wands through the canopy and may result in damage to the tree. Another limitation in these patents is the inability to adjust the wands to a desired amount of penetration into the canopy.

In addition to reducing damage to fruit trees, another desire in harvesting fruit is to reduce the time it takes to harvest fruit. For example, U.S. Pat. No. 5,946,896 is believed to disclose a self contained, self propelled fruit harvester which utilizes oscillating removal heads which consist of stationary rods inserted into a tree's canopy that are vibrated to harvest the fruit. This harvester remains in a stationary position while each oscillating removal head is selectively engaged in a single canopy and activated to remove fruit. After the operator determines that the oscillating removal heads have removed enough fruit from this single tree, the oscillating removal heads are disengaged from the canopy and the harvester is free to move to its next tree for harvesting. Thus, it is believed that this harvester is unable to continuously move through a grove of trees at a constant rate as it harvests fruit.

SUMMARY OF THE INVENTION

It would be advantageous to provide an apparatus capable of harvesting fruit while constantly moving through a field, or grove, of trees. It would also be advantageous to provide an apparatus capable of harvesting more than one tree at a time as it moves through a row of trees where the apparatus can be adjusted to the desired amount of penetration of the wands into the canopy. Additionally, it would also be advantageous to utilize wands for insertion into the canopy where the wands are not rigidly fixed to the apparatus, but are free to move as directed by resistance realized by the wands as a result of contact with foliage of the canopy during operation.

Towards this end, the present invention teaches a harvesting apparatus for dislodging produce from trees comprising a support structure, a boom vertically placed where a first end is connected to the support structure, a means to position a second end of the boom radially from the first end, horizontal posts connected to the boom wherein a first post is positioned above a second post, crank arm rotatably connected between the horizontal posts along an axis where the crank arm has a plurality of elbows, one of a plurality of spools rotatably attached to the crank arm at each respective elbow whereby each spool is free to rotate axially, a plurality of wands axially attached to each spool and spaced around each spool, and a means for rotating the crank arm about its axis.

In one exemplary example of its operation, as the crank arm turns, each spool is free to rotate its wands through the tree where the rate of rotation for each spool is determined by the turning of the crank arm and resistance encountered by the wands in contact with the tree. This movement, in unison with the propelling of the apparatus, causes fruit to be dislodged.

BRIEF DESCRIPTION OF THE DRAWINGS

For a better understanding of the present invention, reference may be had to the following detailed description taking in conjunction with the accompanying drawings in which.

DETAILED DESCRIPTION OF THE INVENTION

Figure 1:
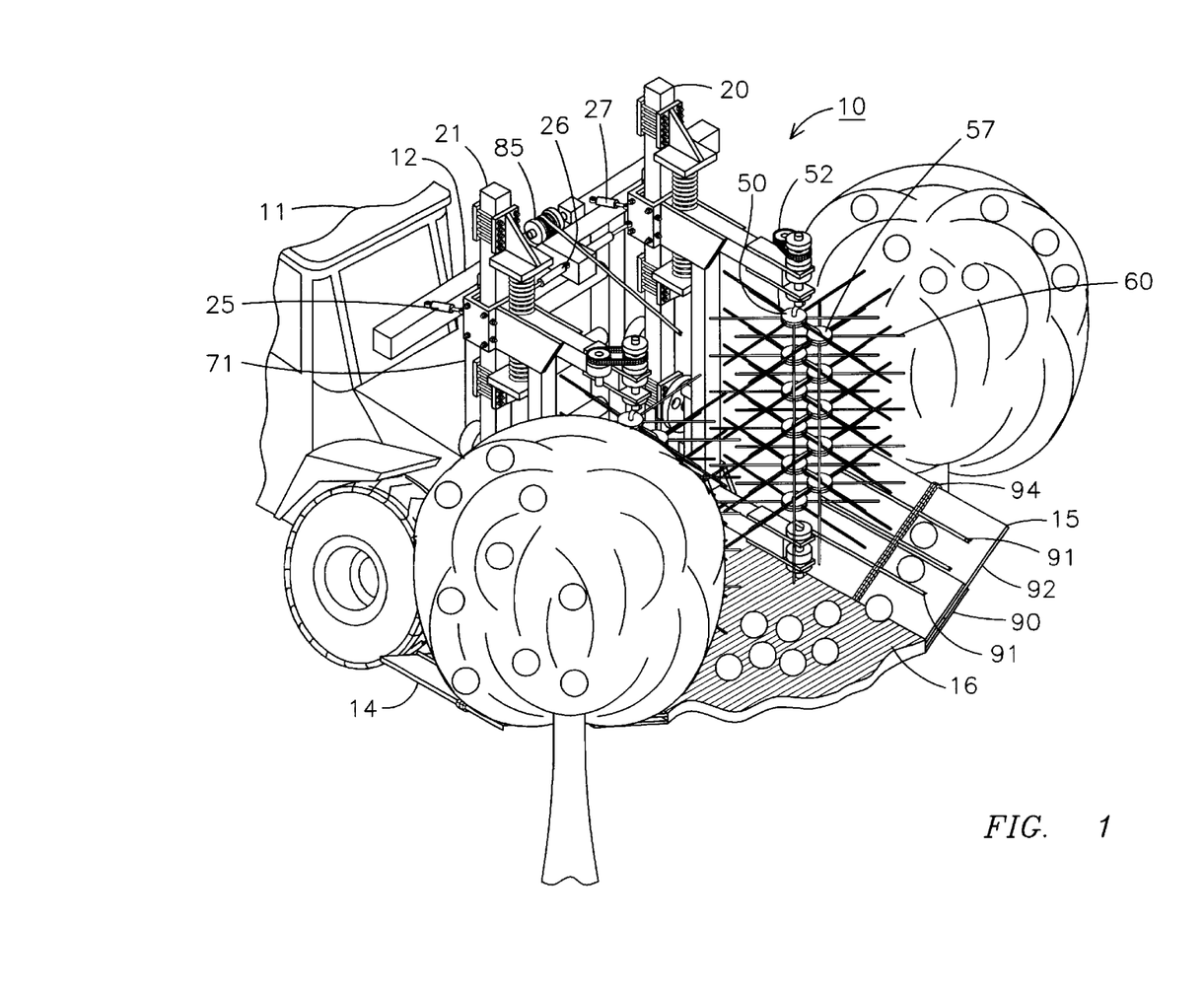
FIG. 1 is a perspective drawing of the fruit harvesting apparatus attached to a wheel loader harvesting citrus trees.
Figure 2:
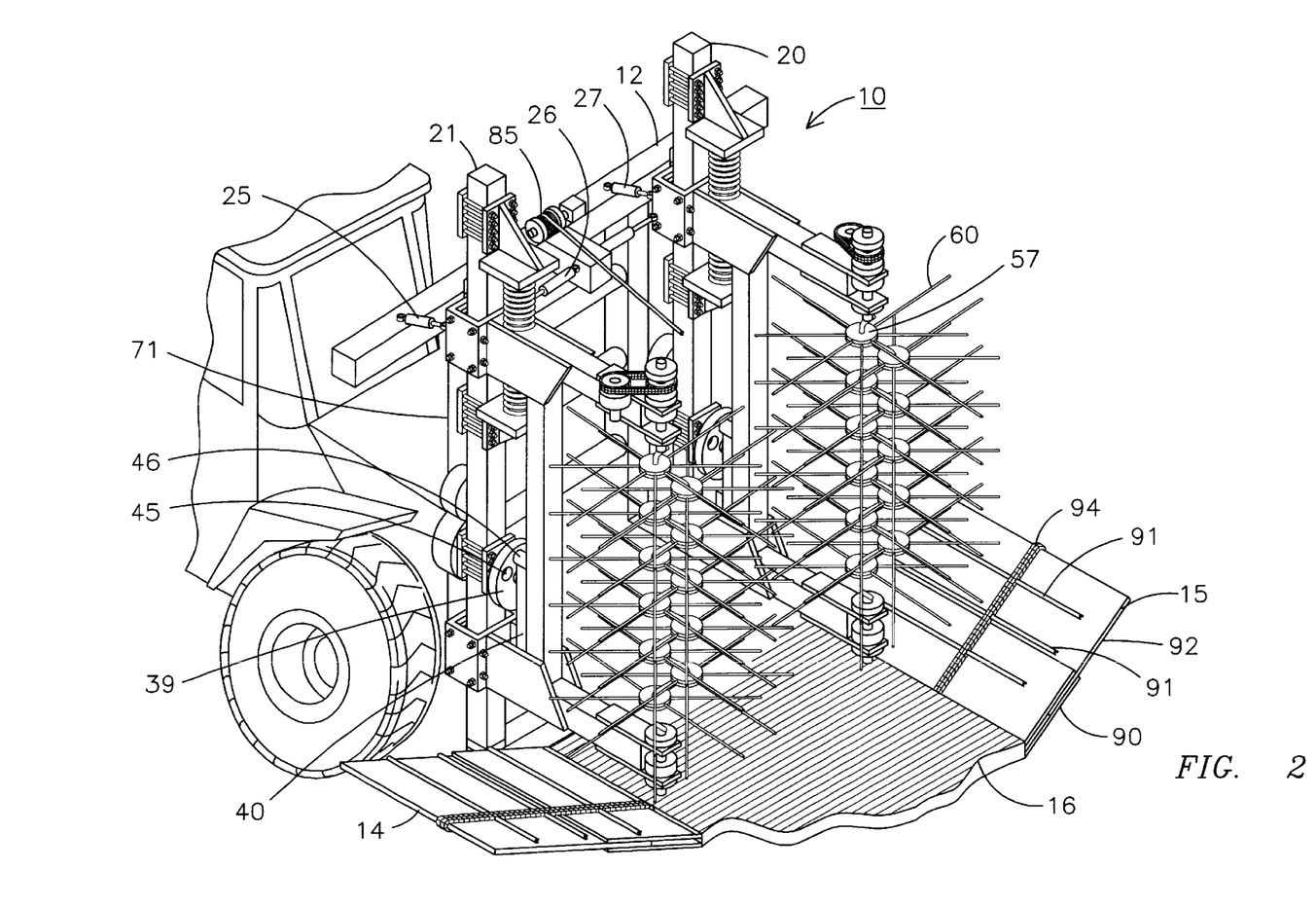
FIG. 2 is an exploded view of FIG. 1 without the citrus trees.

FIG. 1 is a perspective drawing of the fruit harvesting apparatus attached to a wheel loader which is harvesting two citrus trees and FIG. 2 is an exploded view of FIG. 1 without the citrus trees. In an exemplary embodiment, the fruit harvesting apparatus 10 consists of a support structure 71, collection conveyor 16 with telescoping side fruit catcher conveyors 14, 15, and two vertical posts or booms 20, 21. The support structure 71 includes a mast 12 and a base 70, which is better illustrated in FIG. 3. A set of hydraulic actuators or positioning cylinders 25, 26, 27 are fixed between the mast 12 and each boom 20, 21. The fruit harvesting apparatus 10 is attached to a wheel loader 11.

Figure 3:
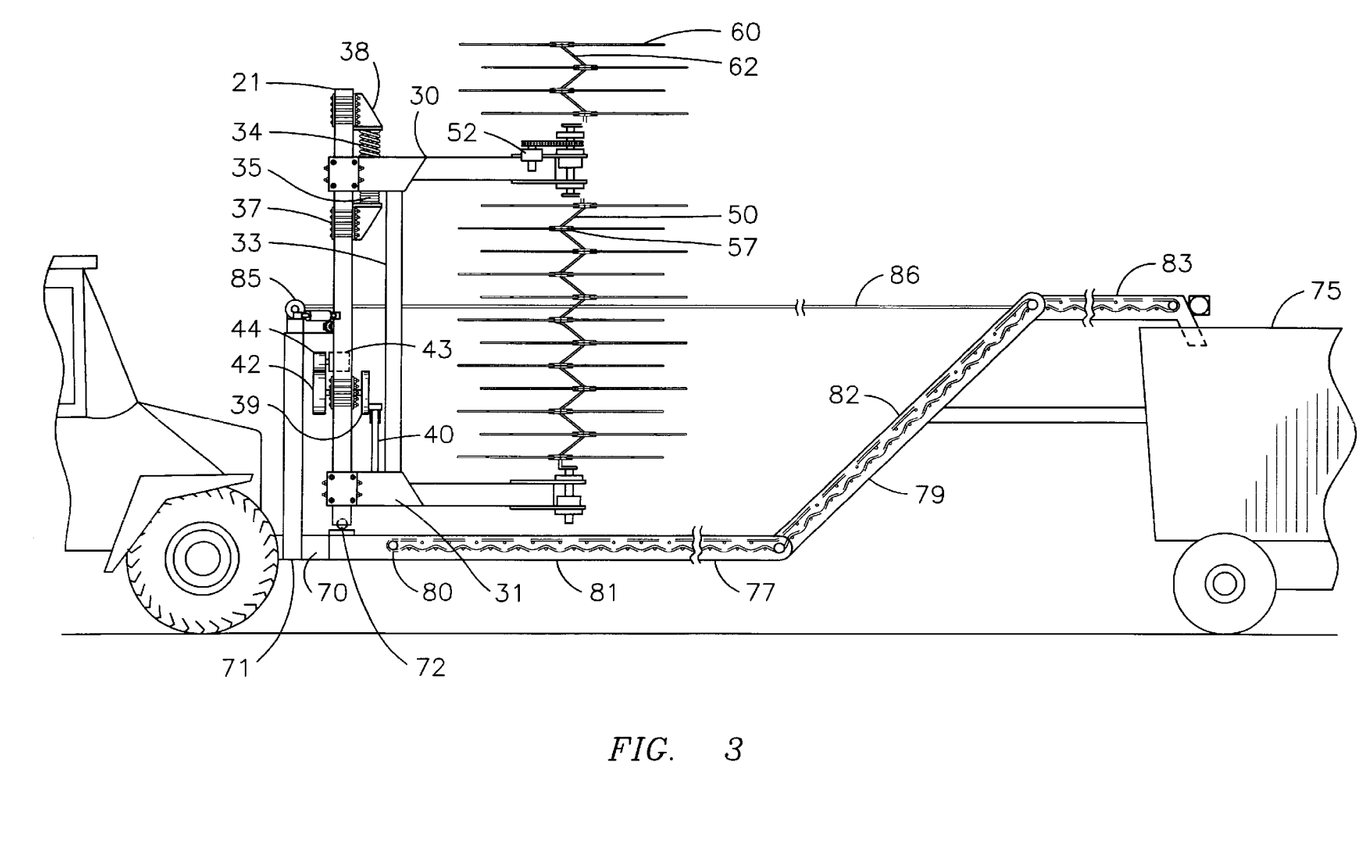
FIG. 3 is a cutaway side view of another embodiment of the fruit harvesting apparatus including a separate fruit storage bin.
Figure 4:
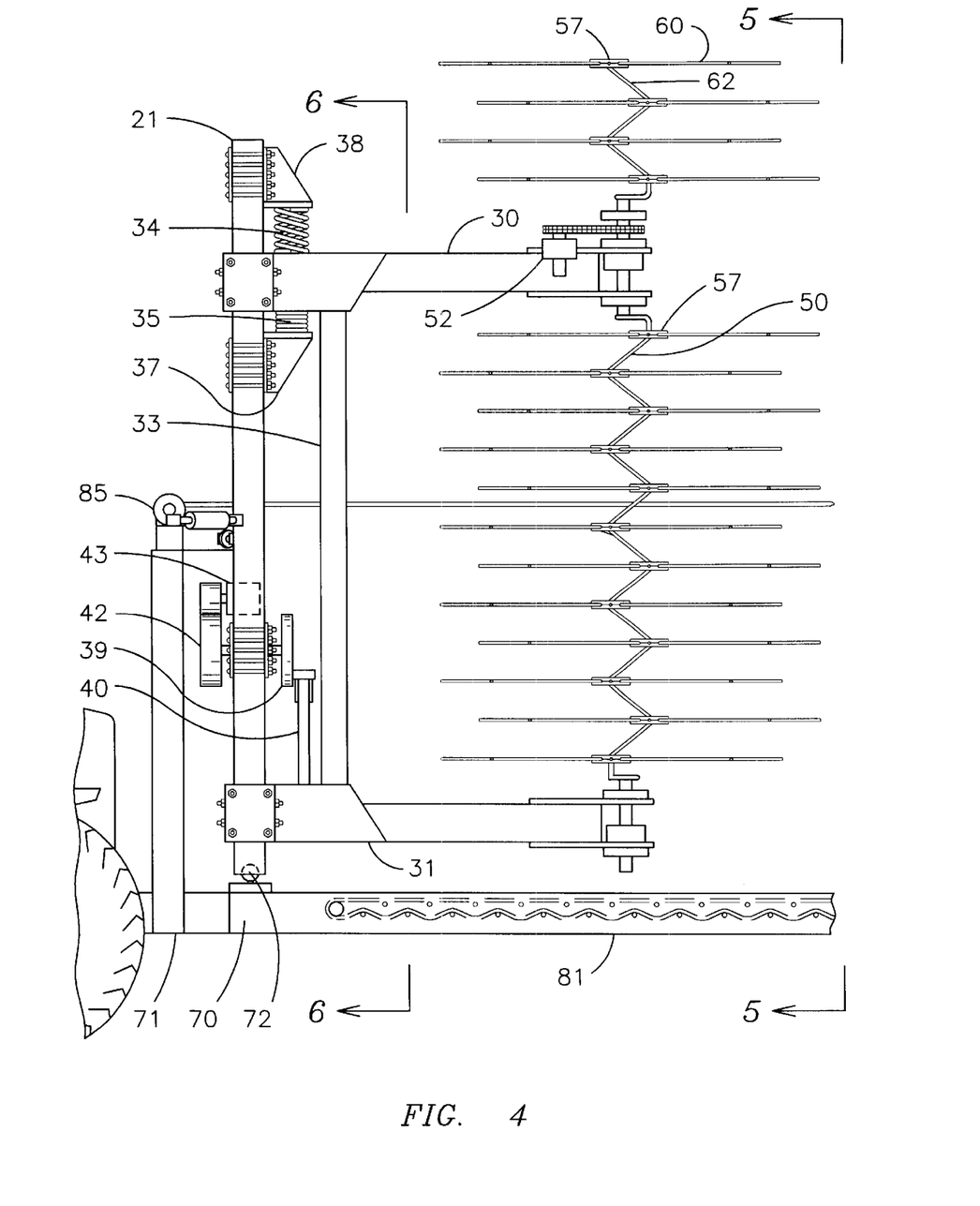
FIG. 4 is an exploded side view of the other embodiment of the fruit harvesting apparatus.

FIG. 3 is a cutaway side view of another embodiment of the fruit harvesting apparatus with a mobile, self propelled container or fruit storage bin and FIG. 4 is an exploded side view of the other embodiment of the fruit harvesting apparatus. As further illustrated in these figures, each boom 21 has two horizontal bars or posts, 30, 31 extending from the boom 21, where the horizontal bars 30, 31 extend away from the wheel loader 11. The horizontal bars 30, 31 are connected by a vertical bar 33 so that the horizontal bars 30, 31 move in unison. During operation, the horizontal bars 30, 31 move vertically up and down the boom 21. On the upper horizontal bar 30, air springs 34, 35 are placed above and below the horizontal bar 30 and are connected to attachments 37, 38 extending from the boom 21. The air springs 34, 35 are placed so as to dampen the actuating and to limit the range of actuating of the horizontal bars 30, 31.

In one exemplary embodiment, a first wheel or gear 39 with a connecting arm 40 that attaches to the lower horizontal bar 31 is the device which lifts and lowers the horizontal bars 30, 31. The first wheel 39 abuts against a second wheel or gear 42 which in turn abuts a third wheel or gear 44 that is attached to a hydraulic motor 43. In one exemplary embodiment the third wheel 44 is a rubber wheel. The hydraulic motor 43 turns the third wheel which turns the second wheel 42 which rotates the first wheel 39, which in turn lifts and lowers the horizontal bars 30, 31. The first wheel 39 includes two separate holes 45, 46 for attaching the connecting arm 40. As better illustrated in FIG. 2, in one exemplary embodiment the holes 45, 46 are spaced so that depending on which hole the connecting arm 40 is connected with, the horizontal bars 30, 31 are lifted either nine inches or six inches from a starting position and then lowered nine inches or six inches. In operation, this movement allows the horizontal bars to be lifted and lowered either 18 inches or 12 inches. In one exemplary embodiment the turning of the wheels 39, 42 is slow and constant where the hydraulic motor 43 turns the wheels 39, 42, 44 at a rate of 40 to 50 revolutions per minute.

As is illustrated in FIGS. 3 and 4, at the end of the lower and upper horizontal bars 30, 31, a crank arm 50 extends between the horizontal bars 30, 31 and is parallel to the boom 21. One end of the crank arm 50 is rotatably connected to the underside of the upper horizontal post 30 and the other end is rotatably connected to the upper side of the lower horizontal post 31 where the crank arm rotates along an axis. On top of the upper horizontal post 30 is a hydraulic motor 52 connected to turn the crank arm 50. Axially free moving spools 57 are positioned at each elbow 58 of the crank arm 50, and a plurality of wands 60 are extended radially from each spool 57. In another exemplary embodiment as illustrated in FIGS. 3 and 4, a second crank arm 62 is fixed to the top of the upper horizontal post 30. The motor 52 also turns the second crank arm 62. The wands 60 are in the shape of rods, and are made of such materials as plastics, nylon, or other material that will reduce damaging trees, where the wands are flexible in nature.

In one exemplary embodiment as illustrated in FIGS. 1 and 2, four wands 60 extend from each spool 57. More wands can be extended from each spool. For example, in another exemplary embodiment the crank arm 50 between the horizontal posts 30, 31 holds sixteen spools 57 and sixteen wands 60 are connected to each spool 57. The crank arm 62 above the upper horizontal post 30 holds four spools 57 with sixteen wands 60 connected to each spool 57.

Figure 5:
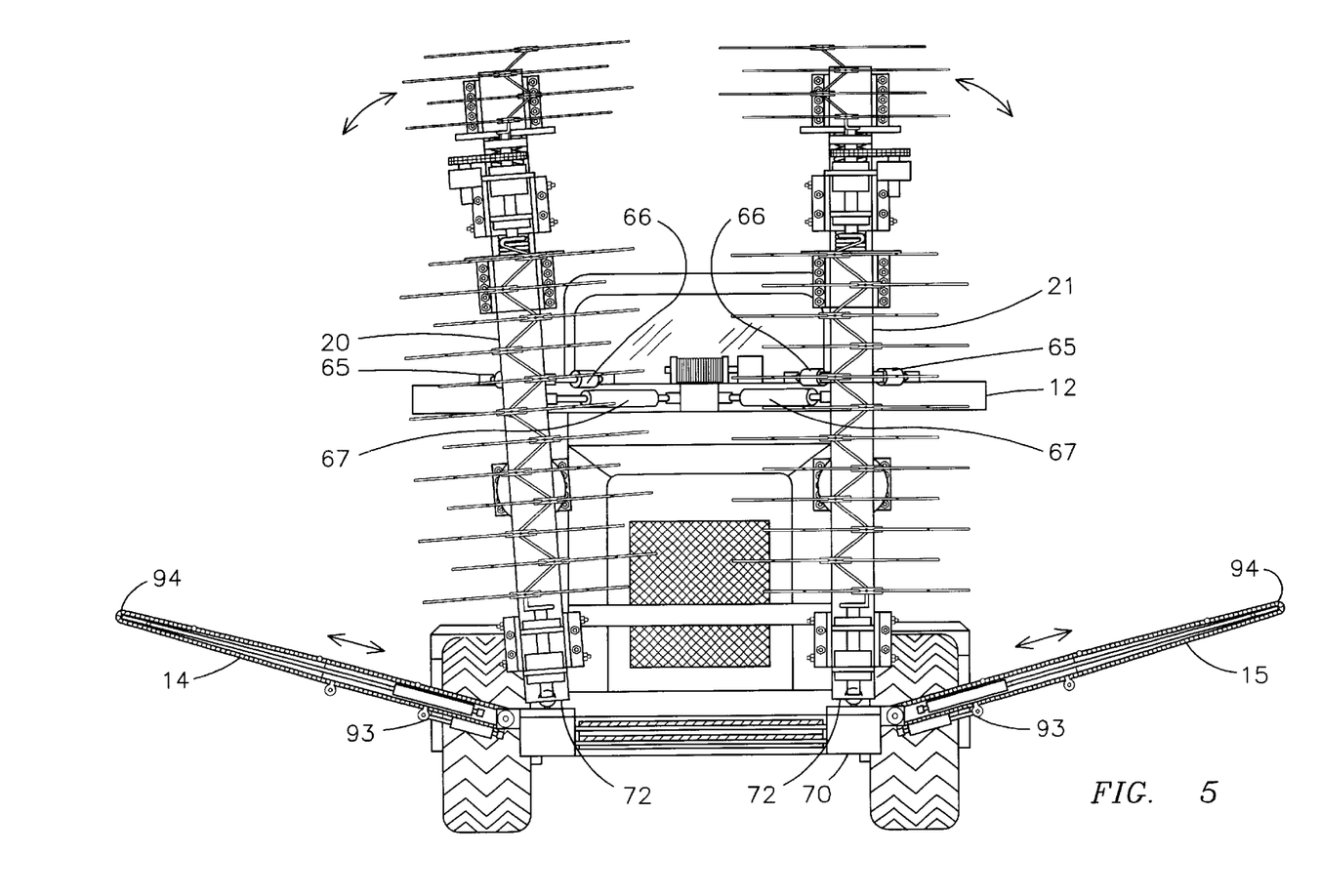
FIG. 5 is a front view of the fruit harvesting apparatus with the booms vertically placed and the telescoping fruit catcher extended.
Figure 6:
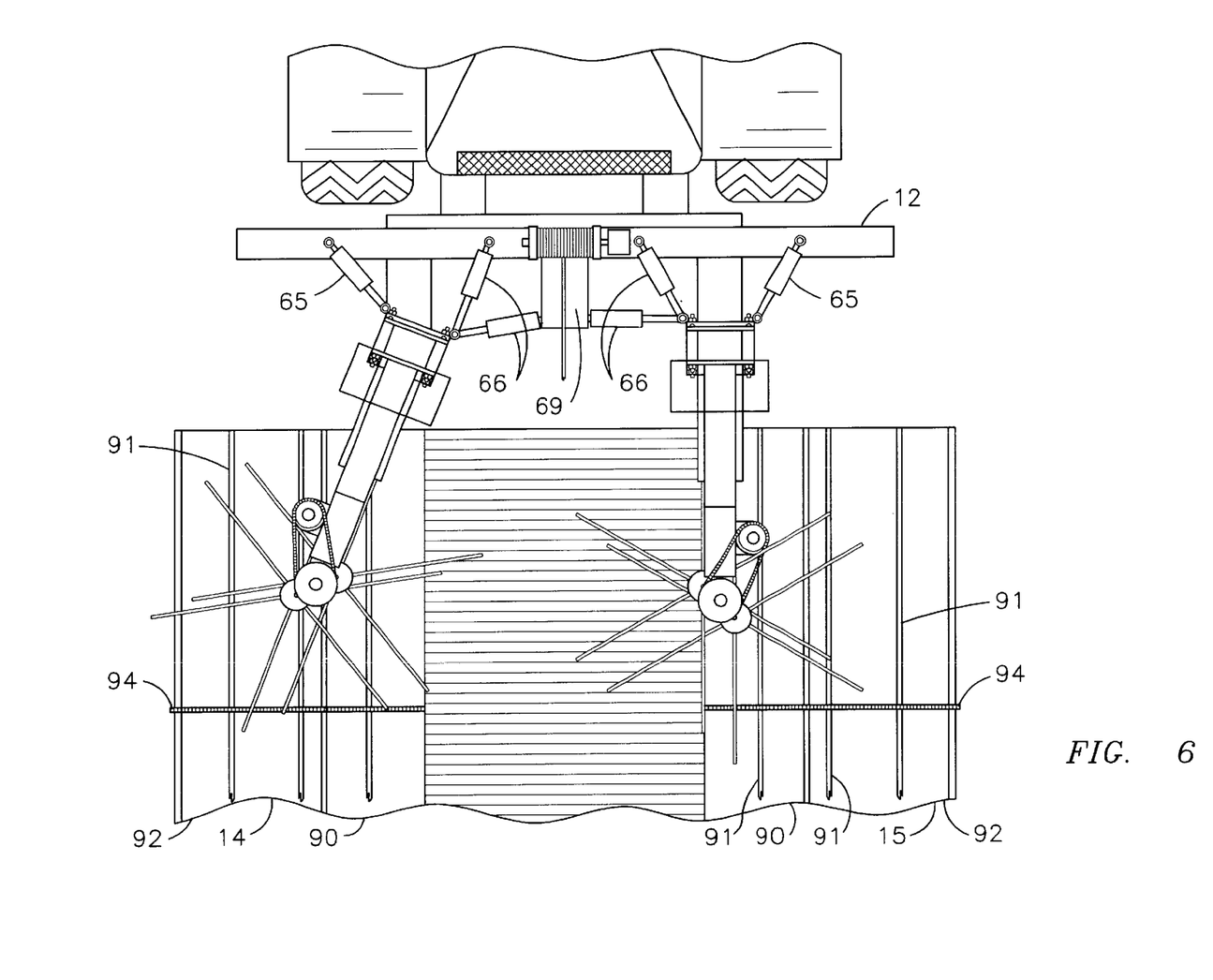
FIG. 6 is a top view of the fruit harvesting apparatus.

FIG. 5 is a front view of the fruit harvesting apparatus with the booms vertically placed and the telescoping fruit catcher extended and FIG. 6 is a top view of the fruit harvesting apparatus. As illustrated in FIGS. 5 and 6, three hydraulic actuators 65, 66, 67 are connected between the booms 21, 22 and the mast 12 to move and control the cantilevering and positioning of each boom 21, 22 radially from the base of the booms 21, 22. In an exemplary embodiment two of the actuators 65, 66 are connected to a top of the mast 12 and the third actuator 67 is connected to a component 69 extending from the mast 12. As illustrated in FIGS. 3 through 5, the base of each boom 21, 22 is connected to the base 70 of the support structure 71 by way of a ball joint connection 72. The ball joint connection 72 in conjunction with the actuators 65, 66, 67 allows each boom 21, 22 to move in a 360 degree radius about the ball joint connection so as to best be positioned to make contact with a canopy of a tree.

As further illustrated in FIG. 3, an additional independently mobile fruit storage bin 75 may be placed in front of the fruit harvesting apparatus for collecting more fruit. As best illustrated in FIGS. 1 and 2, the fruit harvesting apparatus includes a collection conveyor 16 and telescoping fruit catcher conveyors 14, 15 or a three conveyor belt transportation system 14, 15, 16. The collection conveyor 16 includes a conveyor 77, such as a potato chain conveyor, to move the fruit from the collection conveyor 16 to the mobile storage bin 75. The components for the conveyor belt system 77 include a conveyor belt 79 and rollers 80 which guide the belt 79. The conveyor belt transportation system 77 may be segmented 81, 82, 83 so as to fold or adjust the conveyor system 77 to operate with various sized mobile storage bins 75. In one exemplary embodiment a first segment 81 is horizontal. A second segment 82 is angled upward away from the booms 20, 21, and a third segment 83 is horizontal but at a higher height than the first segment 81. A wrench 85 is located on the mast 12 and is connected via a cable 86 to part of the conveyor system 82 so as to adjust the conveyor system 77 to accommodate various shaped mobile storage bins 75.

As best illustrated in FIGS. 2, 5, and 6, the collection conveyor 16 includes telescoping fruit catcher sides 14, 15. In an exemplary embodiment, the telescoping conveyor sides 14, 15 consist of a lower segment 90 which is made of a solid sheet of metal, such as aluminum. The telescoping segment or upper segment 92 is made of a material such as a metal mesh and slides upon the lower segment 90. Bars 91 extend laterally across upper segment 92 and lower segment 90 and are connected to a chain 94. As the chain is rotated by a motor (not shown) the bars are passed over the upper 92 and lower 90 segments. A motor (not shown) is operable to extend the upper segment 92 from its starting position under the lower segment 90 to varied lengths. A tension adjuster (not shown) is connected to the chain to adjust slack in the chain based on the telescoping position of the upper segment 92. Each conveyor side 14, 15 can be lowered and raised by way of a hydraulic actuator 93.

In one exemplary embodiment, the fruit harvesting apparatus 10 is a stand-alone component that is attached to a multi-use wheel loader 11. A power unit (not shown) to operate the actuators 65, 66, 67, 93 telescoping fruit catcher catchers 14, 15, conveyor belt system 77, motors 43, 52, and wrench 85 is either integrated into the fruit harvesting apparatus 10 or the power is received from the wheel loader 11. A control system (not shown) for the actuators 65, 66, 67, 93 is also part of the fruit harvesting apparatus and is easily installed in the wheel loader 11. In another exemplary embodiment, a control system for the motors 43, 52, conveyor belt system 77, and telescoping fruit catcher conveyors 14, 15 is also included. Other embodiments include attaching the fruit harvesting apparatus 10 to a multi-use tractor or some other vehicle to propel the harvesting apparatus 10 through a row of trees, or integrating the harvesting apparatus 10 into a harvesting apparatus-only dedicated self-propelled vehicle.

During one mode of operation, an operator activates the hydraulic actuators 65, 66, 67 to place the booms 20, 21 into position so that the wands 60 on each boom 20, 21 are making contact with tree canopies. The operator will then activate the hydraulic motor 43 connected to the wheels 39, 42 and the hydraulic motors 52 connected to the crank arms 50 to move the horizontal bars 27, 28 up and down on the boom 20, 21 and to turn the crank arms 50, 62 in a circular motion. Each individual spool 57 rotationally oscillates and the flexible wands 60 will freely move to find a place within the foliage of the canopy of least resistance. The operator will also extend the telescoping fruit catchers 14, 15 far enough under the canopy to catch fruit as it falls and retract the catchers 14, 15 when a trunk of a tree is in the path of either catcher 14, 15. While this operation is ongoing, the wheel loader 11 is moving through the rows of trees at a slow, but constant speed where the operator is using the actuators 65, 66, 67 for adjusting the placement of the wands 60 within the canopy as needed. The movement of the wheel loader 11 and resistance encountered by the foliage causes the oscillating wands 60 to rotate through the canopy. This movement along with the lifting and lowering of the wands 60 and rotation of the crank arms collectively causes fruit to dislodge and fall onto one of the three conveyor belts 14, 15, 16.

In another mode of operation, instead of elevating and lowering the horizontal bars 27, 28, these components will remain stationary after the wands are inserted into the foliage. Only the crank arms will rotate as the wheel loader 11 slowly moves through a row of trees. The movement of the wheel loader 11, resistance encountered by the foliage, and rotation of the crank arms will still cause the oscillating wands 60 to rotate through the canopy, causing fruit to dislodge and fall onto one of the three conveyor belts 14, 15, 16.

While the invention has been described in what is presently considered to be the preferred embodiment, many variations and modifications will become apparent to those skilled in the art. Accordingly, it is intended that the invention not be limited to the specific illustrative embodiment but be interpreted within the full spirit and scope of the appended claims.

What is claimed is:

1. A harvesting apparatus for dislodging produce from trees comprising:
    a support structure;
    a boom vertically placed where a first end is connected to said support structure;
    a means to position a second end of said boom radially from said first end;
    horizontal posts connected to said boom wherein a first post is positioned above a second post;
    crank arm rotatably connected between said horizontal posts along an axis where said crank arm has a plurality of elbows;
    one of a plurality of spools rotatably attached to said crank arm at each respective elbow whereby each said spool is free to rotate axially;
    a plurality of wands axially attached to each said spool and spaced around each said spool; and
    a means for rotating said crank arm about its axis.

2. The apparatus of claim 1 wherein said support structure comprises a mast horizontally placed and a base for mounting said boom.

3. The apparatus of claim 1 further comprising a means for moving said horizontal posts up and down relative to said boom.

4. The apparatus of claim 3 further comprising air springs attached between said support structure and said first horizontal post to limit vertical movement of said horizontal posts.

5. The apparatus of claim 1 wherein said boom is connected to said support structure with a ball joint connection.

6. The apparatus of claim 1 further comprising a second crank arm with elbows where individual spools are placed at each elbow and wands extend from each said spool where said one end of said second crank arm is connected to said first horizontal post.

7. The apparatus of claim 6 further comprising a means for rotating said second crank arm axially.

8. The apparatus of claim 1 wherein a second boom with said horizontal posts, said crank arm, said spools, and said wands is placed adjacent to said first boom wherein each said boom is operable to be independently positioned to dislodge produce from said trees on opposite sides of said apparatus.

9. The apparatus of claim 6 wherein a second boom with said horizontal posts, said crank arms, said spools and said wands is placed adjacent to said first boom wherein each said boom is operable to be independently positioned to dislodge produce from said trees on opposite sides of said apparatus.

10. A harvesting apparatus for dislodging produce from trees in a grove, said apparatus comprising:
    a propulsion vehicle;
    a support structure attached to said vehicle;
    a collection conveyor attached to said support structure;
    telescoping side conveyors attached to adjacent sides of said collection conveyor;
    means to extend said telescoping side conveyors to a greater length and retract to a lesser length;
    a boom vertically placed where a first end is connected to said support structure;
    means to position a second distant end of said boom radially from said first end;
    horizontal posts slidably connected to said boom wherein a first post is positioned above a second post;
    a lifting means for raising and lowering said horizontal posts;
    crank arm rotatably connected between said horizontal posts where said crank arm has a plurality of elbows;
    spools with individual holes at each center where said crank arm fits through said holes and each individual spool is located at each said elbow whereby said spools are free to rotate axially;
    a plurality of wands axially attached to each said spool equal spaced around each said spool;and
    a means for rotating said crank arm about its axis.

11. The apparatus of claim 10 further comprising a produce storage bin disposed proximate to said conveyor.

12. The apparatus of claim 10 further comprising a means to raise said telescoping side conveyors to a vertical position and to lower to a horizontal position and to any position there between.

13. The apparatus of claim 10 wherein said support structure comprises a mast horizontally placed and a base for mounting said boom.

14. The apparatus of claim 10 wherein said collection conveyor is segmented wherein a first segment, closest to said vehicle, is horizontal, a second segment is angled upward, and a third segment is horizontal at a higher elevation than said first segment.

15. The apparatus of claim 10 further comprising a means to lower and raise said third segment of said collection conveyor to fit a storage bin.

16. The apparatus of claim 10 further comprising a second crank arm with spools at each elbow and wands extending from said each spool where said one end of said second crank arm is connected to said first horizontal post.

17. The apparatus of claim 16 further comprising a means for rotating said second crank arm axially.

18. The apparatus of claim 10 wherein a second boom with said horizontal posts, crank arm, said spools and said wands is placed adjacent to a first boom wherein each said boom is operable to be independently positioned to optimally dislodge produce from said trees on opposite sides of said apparatus.

19. The apparatus of claim 16 wherein a second boom with said horizontal posts, said crank arms, said spools and said wands is placed adjacent to a first boom wherein each said boom is operable to be independently positioned to optimally dislodge produce from said trees on opposite sides of said apparatus.

20. The apparatus of claim 10 further comprising air springs placed between said boom and said support structure to limit vertical movement of said horizontal posts.

21. A method for dislodging produce from a grove of trees comprising:

moving a harvesting apparatus though a path between adjacent rows of trees in said grove;

providing crank arms having plurality of freely rotatable spools;

providing a plurality of wands axially extending from said spool;

placing wands into canopies of said trees in said adjacent rooms;

providing a mechanism for axially rotating said crank arms while moving said apparatus through said path; and dislodging fruit from said trees.

22. The method of claim 21 further comprising providing mechanism for moving said crank arms up and down while moving said apparatus through said path.

23. The method of claim 21 further comprising catching said produce with a collection conveyor and telescoping side conveyors.

24. The method of claim 23 further comprising transporting said produce to a storage bin.

* * * * *